(12) United States Patent
Pike

(10) Patent No.: US 9,312,798 B2
(45) Date of Patent: Apr. 12, 2016

(54) SENSOR COMMUATED ELECTRIC MOTOR WITH SENSORLESS ANGULAR POSITION DETERMINATION AND METHOD

(75) Inventor: John Pike, Aberdeen (GB)

(73) Assignee: Sondex Limited, Hampshire (GB)

( * ) Notice: Subject to any disclaimer, the term of this patent is extended or adjusted under 35 U.S.C. 154(b) by 1219 days.

(21) Appl. No.: 13/270,426

(22) Filed: Oct. 11, 2011

(65) Prior Publication Data

US 2013/0088361 A1 Apr. 11, 2013

(51) Int. Cl.
*G01V 3/00* (2006.01)
*H02P 6/18* (2006.01)
*H02P 6/12* (2006.01)

(52) U.S. Cl.
CPC . *H02P 6/182* (2013.01); *H02P 6/12* (2013.01)

(58) Field of Classification Search
CPC ........................................................ G01V 3/00
USPC .................................. 340/853.1, 854.3, 854.4
See application file for complete search history.

(56) References Cited

U.S. PATENT DOCUMENTS

| | | | |
|---|---|---|---|
| 4,493,200 A | 1/1985 | Rhoades | |
| 4,764,711 A * | 8/1988 | Deller | H02P 6/182 318/619 |
| 5,115,415 A | 5/1992 | Mumby et al. | |
| 5,140,245 A | 8/1992 | Stacey | |
| 5,333,686 A | 8/1994 | Vaughan et al. | |
| 5,384,527 A | 1/1995 | Rozman et al. | |
| 5,461,293 A | 10/1995 | Rozman et al. | |
| 5,487,827 A * | 1/1996 | Peterson | A61M 1/16 210/321.6 |
| 5,493,163 A | 2/1996 | Nishikawa | |
| 5,495,162 A | 2/1996 | Rozman et al. | |
| 5,696,430 A | 12/1997 | Erdman et al. | |
| 5,744,027 A * | 4/1998 | Connell | A61M 1/16 210/143 |
| 5,747,971 A | 5/1998 | Rozman et al. | |
| 6,016,288 A | 1/2000 | Frith | |
| 6,104,113 A | 8/2000 | Beifus | |
| 6,284,131 B1 * | 9/2001 | Hogard | A61M 1/16 210/143 |
| 6,630,809 B2 * | 10/2003 | Chen | H02P 21/0035 318/800 |
| 7,262,569 B2 | 8/2007 | Douglas | |
| 7,564,741 B2 | 7/2009 | Pratt et al. | |
| 7,567,047 B2 | 7/2009 | Rozman | |
| 7,638,959 B2 | 12/2009 | Rozman et al. | |

(Continued)

FOREIGN PATENT DOCUMENTS

CA 2 463 354 A1 10/2005
EP 675590 A1 * 10/1995

(Continued)

OTHER PUBLICATIONS

EP Search Report and Written Opinion dated Feb. 27, 2014 issued in connection with corresponding EP Application No. 12187659.3.

*Primary Examiner* — Amine Benlagsir
(74) *Attorney, Agent, or Firm* — GE Global Patent Operation

(57) ABSTRACT

An electric motor assembly, mud pulser and a method for transmitting data. The electric motor assembly includes an electric motor having a rotor and a stator that includes one or more windings; one or more sensors on the stator and configured to determine an angular position of the rotor; and a motor control circuitry configured to control a commutation of the electric motor based on signals received from the one or more sensors. The motor control circuitry is configured to determine a total angular rotation of the rotor based on a back emf voltage of the one or more windings and independent of the signals from the one or more sensors.

10 Claims, 12 Drawing Sheets

(56) References Cited

U.S. PATENT DOCUMENTS

| | | | | |
|---|---|---|---|---|
| 2003/0209475 A1* | 11/2003 | Connell | | A61M 1/16 210/143 |
| 2003/0222022 A1* | 12/2003 | Connell | | A61M 1/16 210/636 |
| 2004/0178757 A1* | 9/2004 | Petersen | | H02K 21/12 318/400.11 |
| 2006/0145648 A1* | 7/2006 | Fujita | | G05B 19/416 318/661 |
| 2007/0229004 A1 | 10/2007 | Fukamizu et al. | | |
| 2008/0061723 A1* | 3/2008 | Fujita | | G05D 13/62 318/560 |
| 2009/0256507 A1* | 10/2009 | Thompson | | B60L 11/18 318/400.13 |
| 2010/0256782 A1* | 10/2010 | Dai | | H02P 6/14 700/14 |
| 2012/0273271 A1* | 11/2012 | Stuart-Bruges | | E21B 47/187 175/38 |

FOREIGN PATENT DOCUMENTS

| | | | | |
|---|---|---|---|---|
| EP | 0675590 A1 | | 10/1995 | |
| EP | 1978631 A1 | | 10/2008 | |
| GB | 2443415 A | * | 5/2008 | ............. E21B 47/18 |
| GB | 2 443 415 A | | 7/2008 | |
| WO | 2009001291 A2 | | 12/2008 | |

* cited by examiner

SENSOR COMMUATED ELECTRIC MOTOR WITH SENSORLESS ANGULAR POSITION DETERMINATION AND METHOD

FIELD OF THE INVENTION

Embodiments of the subject matter disclosed herein generally relate to methods and motors and, more particularly, to mechanisms and techniques that use sensors for commutating a motor and use back electro-magnetic force (emf) for determining a rotational position of a rotor of the motor.

DISCUSSION OF THE BACKGROUND

The increased drilling of directional oil wells requires that information related to bit orientation during drilling as well as data relating to the type of geological formation then being drilled be continuously transmitted to surface so that corrections can be made to the drill bit's orientation so as to guide the wellbore in the desired direction, and receive information as to the geologic formation being encountered.

When performing directional drilling, a measurement-while-drilling (MWD) mud pulser is commonly used to transmit such variety of measurements obtained downhole to the surface for processing. These measurements are transmitted as mud pulses, referred to as mud pulse telemetry. The mud pulser operates by modulating, downhole, pressure of the drilling fluid or 'mud' which is being pumped down the hollow drill pipe, in order to thereby transmit to surface, through the modulated pressure variations in the drilling mud, information relating to bit orientation and geologic formation.

Many designs of mud-pulsers have been used downhole, with varying success. One example of a direct current (DC) motor-operated mud-pulser uses a reversible electric motor together with Hall effect shaft sensors. The Hall effect sensors, mounted on the motor's stator, determine a position of the rotor relative to the stator and how (and when) to effectively commutate the motor (i.e., govern the respective energization of the respective stator windings of the DC motor so as to govern rotation of the DC motor). However, such Hall effect sensors are used not only for motor commutation, but are further used for sensing rotor revolutions and with revolution-counting circuitry are used for determining pilot valve position, in order to modulate the control valve and thus mud pulses being transmitted to surface.

Another design of mud-pulser has a brushless electric motor with a rotary-linear conversion system for governing a position of a pilot valve. However, this design does not have any rotor position sensor, such as Hall effect sensors, for commutation of the electric motor. This mud-pulser uses back emf voltages of the electric motor to both (i) commutate the electric motor, and (ii) further determine rotor position and number of revolutions, and thereby determine valve position. In such manner, the need for Hall effect sensors is avoided. Thus, a method for operating such electric motor uses the back emf to determine rotor position and involves keeping a count of phase transitions in a given motor direction, as a means of determining a position of a pilot valve relative to the completely opened position or completely closed position.

Where back emf is used to commutate a motor, the motor need to be turning at a minimum rate to generate sufficient back emf to be sensed. With sensorless commutation, at commencement of motor operation and when low motor rotations per minute (RPM), the back emf of the motor is low, which may result in less than perfect motor commutation.

Accordingly, there is a need to commutate an electrical motor with high precision and also to determine an angular position of the rotor of the motor.

SUMMARY OF THE INVENTION

According to an exemplary embodiment, there is an electric motor assembly that uses sensors for commutation and back emf voltage to determine an angular position. The electric motor assembly includes an electric motor having a rotor and a stator that includes one or more windings; one or more sensors on to the stator and configured to determine an angular position of the rotor; and a motor control circuitry electrically connected to the electric motor and to the one or more sensors and configured to control a commutation of the electric motor based on signals received from the one or more sensors. The motor control circuitry is configured to determine a total angular rotation of the rotor based on a back emf voltage of the one or more windings and independent of the signals from the one or more sensors.

According to another exemplary embodiment, there is a mud pulser configured to transmit data from inside of a well to a surface of the well through pressure waves generated in a fluid column that flows inside the well. The mud pulser includes a housing configured to be supported by a wall of the well; an electric motor located in a motor cavity of the housing and having a rotor and a stator that includes one or more windings; one or more sensors on the stator and configured to determine an angular position of the rotor; a pilot valve connected to the electric motor and configured to move in a pilot valve chamber for closing and opening a valve orifice for generating pressure signals that propagate through the fluid column to the surface; and a motor control circuitry electrically connected to the electric motor and the one or more sensors, and configured to control a commutation of the electric motor based on signals received from the one or more sensors. The motor control circuitry is configured to determine a total angular rotation of the rotor based on a back emf voltage of the one or more windings and independent of the signals from the one or more sensors.

According to still another exemplary embodiment, there is a method for controlling an electric motor. The method includes a step of commutating the electric motor based on signals from one or more sensors attached to a stator of the electric motor; and a step of determining with a motor control circuitry, electrically connected to the electric motor, a total angular rotation of a rotor of the electric motor, based on a back emf voltage of one or more windings of the stator and independent of the signals from the one or more sensors.

In yet a further aspect of the present invention, an exemplary embodiment may comprise a computer readable medium, such as an EPROM chip, ASIC, UECM IC, or flash memory or the like having encoded thereon instructions such as machine-readable code, for instructing a controller within the motor control circuitry to perform any one of the methods described above.

BRIEF DESCRIPTION OF THE DRAWINGS

In the accompanying drawings, which illustrate one or more exemplary embodiments and are not to be construed as limiting the invention to these depicted embodiments.

DETAILED DESCRIPTION OF THE EMBODIMENTS

Figure 1:
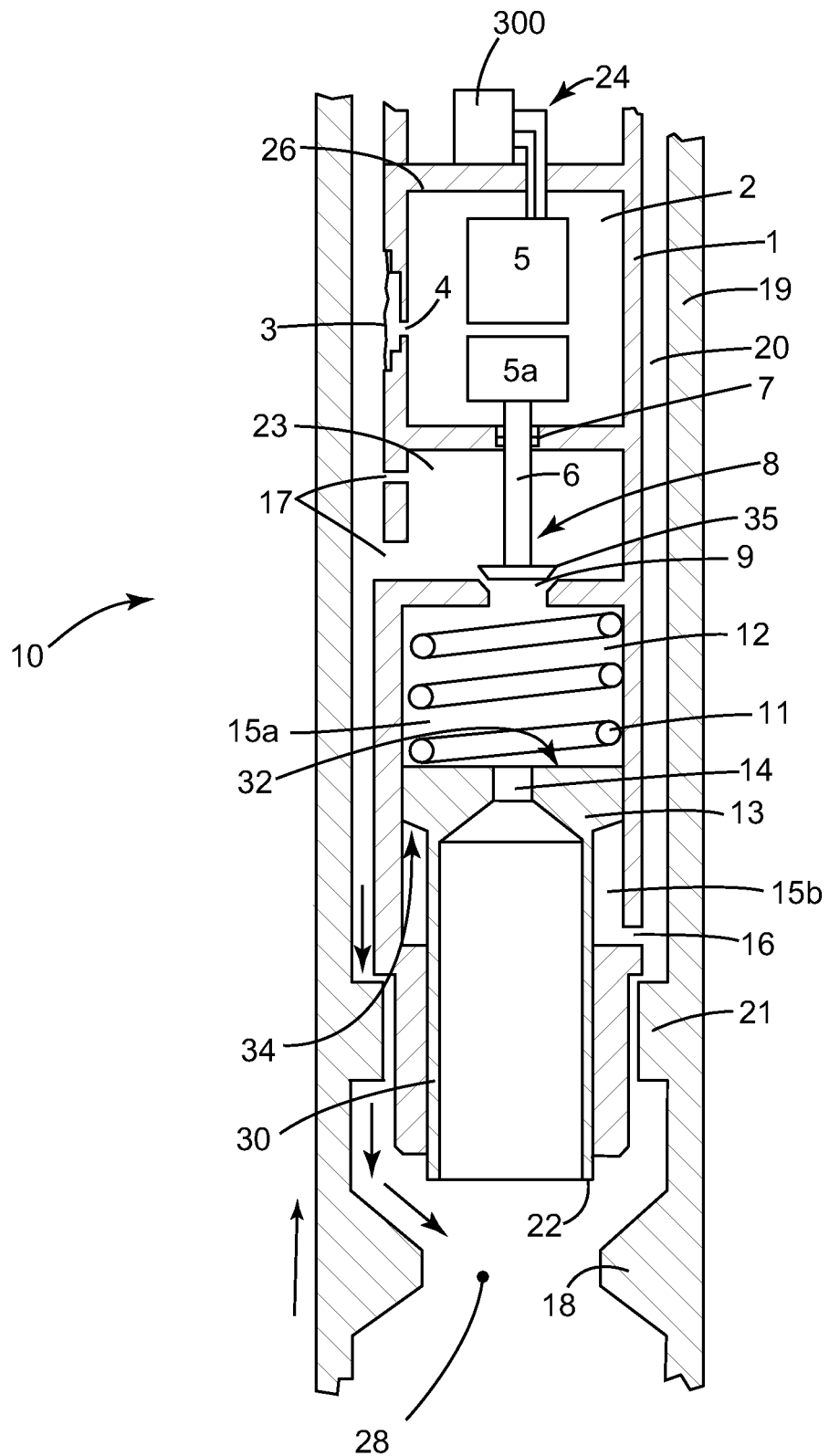
FIG. 1 is a side sectional view of a mud pulser according to an exemplary embodiment.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a brushless direct current (BLDC) electrical motor connected to a pilot valve in a mud pulse. However, the embodiments to be discussed next are not limited to the BLDC motor or to the pilot valve but may be applied to other DC motors connected to other components.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a novel hybrid design for a BLDC motor uses Hall effect sensors solely and limited to the purpose of commutating the BLDC motor, and thus has good motor commutation at all motor speeds, even at a start-up of the motor. However, the BLDC motor uses back emf voltages for the purpose of determining a pilot valve position, where the pilot valve is configured to linearly move along a predetermined direction when a rotor of the motor is turned. A method of using back emf voltages to determine a rotor position of the motor may use (i) phase transitions in the back emf voltages as disclosed, for example, in CA 2,738, 271, or (ii) motor voltage, overall current and average winding resistance to calculate back emf voltages.

The later method may integrate the determined back emf voltage (after first multiplying it by a constant) as discussed later to determine the amount of total angular rotation d over a given period (and thus correspondingly determine the amount of pilot valve movement from a known starting position). The back emf may be calculated rather than merely being measured at a given time. For example, by knowing the motor voltage V, the current $I_a$, $I_b$, or $I_c$ supplied to a particular energized winding A, B, or C, and using the particular (known) winding resistance R, the back emf voltage may then be calculated using Ohm's law and the formula:

$$\text{back emf} = V_{across\ battery} - (I_{winding\ a,\ b,\ or\ c} \cdot R_{winding\ a,\ b,\ or\ c}).$$

Alternatively, the back emf may be sensed across a single winding of the rotor, during a time when no energization is being supplied to such rotor winding, in order to determine the instantaneous back emf of the motor. For example, for a rotor having three rotor windings A, B, and C, when energization is supplied to two rotor windings thereof (for example rotor windings A and B during commutation of the motor), one rotor winding is left de-energized (e.g., only two rotor windings are energized at one time during rotor rotation). For this example, if rotor windings A and B are energized, the remaining rotor winding C may be used to measure the back emf of the motor.

According to another exemplary embodiment, the back emf is calculated based on the overall current supplied to the motor and based on the average resistance of the windings. More specifically, the overall current supplied to the motor is measured and the average resistance to the windings is known, for example, from previous measurements. Then, the measured overall current is multiplied with the average resistance of the windings and this product is subtracted from an overall voltage supplied to the motor to determine the back emf. In this way, the above-noted process may be applied to any type of DC motor, independent of the number of windings or the type of commutation. It is noted that in one application, the DC motor has two wires through which the overall voltage is supplied to the motor. Thus, for this application, the overall current going through the wires and the overall current across the wires are measured and used to determine the back emf. It is noted that for this method there is no need to have commutation information.

Regardless as to which approach is used to determine the back emf voltage, the back-emf voltage is proportional to the motor shaft speed w related by a known constant k (i.e., back emf=k×ω). Such a constant k may be determined by measuring the motor shaft speed when the motor runs unloaded on a known supply voltage V. The winding resistance R of the stator windings may be measured with the motor stalled. Thus, the back emf at any given time is obtainable by measuring the voltage V supplied to the motor and subtracting the product of the the current I and the stator winding resistance R as noted above. The amount of angular rotation of the motor over time is equal to the time-integral of the angular speed of the motor rotor.

Knowing the above, and considering that the rotor speed ω of the motor is equal to the angular rotation change dθ over time dt (i.e., ω=dθ/dt), by integrating both sides of the relationship dθ=ωdt and substituting for the proportional relationship ω=k·[V−(I·R)], produces the formula:

$$\text{current rotor angular rotation } \theta = \int k \cdot [V - (I \cdot R)] dt.$$

The above formula may be used to determine, through integration, the amount of angular rotation of the motor from sensed back emf values, or from sensed values of V and I for a particular stator winding, or by sensing the overall current and the overall voltage to the motor, with parameters k and R being previously known/measured. Such a motor having circuitry to determine the angular position of the rotor may be used in various fields. One example is a mud pulser in which the rotational motion of the rotor of the motor is used to linearly displace a pilot valve for sending information through the mud column. Those skilled in the art would realize that the motor may be used in other environments for modulating a fluid flow, for example, to transmit data of for completely other purposes.

However, for simplicity, in the following, the exemplary embodiments are described with regard to a mud pulser having a BLDC motor that is configured to control a pilot valve which controls a main restrictor valve. The pilot valve may be a "poppet and orifice" type pilot valve, and the BLDC motor is connected to a rotary-to-linear converter that is mechanically coupled to the "poppet and orifice" type valve to thereby enable linear reciprocation of the "poppet and orifice" type valve to allow opening and closing of a port through which a fluid flows. This motion of the valve allows control of a main restrictor valve of the pulser and, thus, a pulse modulation of a pressure wave which results from the opening and closing (or partial opening or closing) of such main restrictor valve. Alternatively, the pilot valve may be a rotary valve, which valve is rotated by virtue of being mechanically coupled, through reduction gearing or otherwise, to the BLDC motor.

Details of the BLDC motor, valves, and mud pulser are now discussed with reference to the figures. In an exemplary embodiment, FIG. 1 shows a mud pulser 10 deployed in a drill pipe bottom hole assembly (hereinafter referred to simply as the "drill pipe") 19. The mud pulser 10 includes a main housing 1 retrievably located on fins 21 provided in the drill pipe 19. The connection with the drill pipe 19 may also include a mule shoe arrangement to ensure rotational alignment of directional sensors housed in the mud pulser 10. The main housing 1 is smaller in diameter than the drill pipe 19 so as to create an annulus 20 though which drilling mud can flow. An orifice collar 18 is provided in the drill pipe 19, below the fins 21, for creating an orifice or restriction 28 in the flow of the drilling mud in the pipe. As indicated by the arrows in FIG. 1, drilling mud can therefore flow along the annulus 20, past the fins 21, and through the orifice 28 to exit the drill pipe 19 and return, following the arrows shown, via an annulus between the drill pipe 19 and the walls of the bore hole (not shown).

A main piston 13 is provided within a chamber 12. The piston 13 divides the chamber 12 into an upper chamber 15a and a lower chamber 15b. The piston 13 is acted upon by a compression spring 11 located between an upper face 32 of the piston 13 and a top wall of the chamber 12 so that the piston 13 is biased to move downwards towards the orifice 28 in the drill pipe 19. A hollow cylinder 30 extends from a lower face 34 of the piston 13 and out of the lower chamber 15b towards the orifice 28, so that when the main housing 1 is located by the fins 21 in the drill pipe 19, the open end of the hollow cylinder 30 acts as a valve tip 22 that can be moved into the flow of mud through the orifice 28 to create a pressure increase in the mud in the annulus 20. As discussed in further detail below, the combination of the hollow cylinder 30 and the orifice 28 acts as a main restrictor valve responsible for generating the pressure pulses in the mud that are used to communicate with the surface.

The hollow cylinder 30 communicates with the upper chamber 15a via a control port 14 provided in the main piston 13. At the same time, a port 16 in the main housing 1 allows drilling mud to enter the lower chamber 15b underneath the lower face 34 of the piston 13.

A pilot valve chamber 23 is provided in the housing 1, and fluid communication with the upper chamber 15a is regulated by means of a pilot valve 8 in the top of an end wall of the upper chamber 15a. In the depicted embodiment, the pilot valve 8 is in the form of a linearly reciprocating "poppet and orifice" type valve, although a rotary valve could alternatively be used. The pilot valve 8 in the form shown includes a shaft 6 having a disc 35 at one end, that is movable such that the disc 35 steps a valve seat/orifice 9, thus, preventing mud flow through the pilot valve 8 from chamber 23 to chamber 15a or vice versa. The pilot valve 8 is linearly reciprocated by a motor assembly 5, 5a discussed in more detail below. Mud from the drill pipe 19 enters the pilot valve chamber 23 via ports 17.

When the pilot valve 8 is open, mud may flow from the pilot valve chamber 23 into the upper chamber 15a through the valve seat/orifice 9. By "open", it is meant that there is a gap present between the disc 35 on the end of the shaft 6 and the valve seat/orifice 9 through which at least some of the mud may flow. The disc may partially, but not entirely, step the valve seat/orifice 9 such that the flow of the mud can be restricted, but not stopped. Accordingly, "open" includes both partially open, in which the flow of the mud is restricted but not stopped, and completely open, in which the mud flows unrestricted by the pilot valve 8 or the disc through the valve seat/orifice 9. "Closed" includes the state in which the disc 35 at the end of the shaft 6 is inserted into the valve seat/orifice 9 as far as possible, or such that the flow of the mud is stopped.

The ports 16, 17, as well as the valve seat/orifice 9, can be made too large to be steped by lost-circulation material ("LCM") and other particulates in the drilling mud, and may also be angled to discourage such matter from accumulating.

The motor assembly 5, 5a is contained in a motor cavity 2. The motor assembly 5, 5a may include a BLDC motor 5 and a rotary-to-linear motion converter 5a such as a threaded ball-and-screw device that converts the rotational output of the BLDC motor 5 into the reciprocating linear movement of the shaft 6. As noted above, other types of DC motors may be used. The shaft 6 is coupled to the motor assembly 5, 5a through a sliding seal 7 located in the wall of the motor cavity 2 so as to prevent the motor cavity 2 from being contaminated with the drilling mud. The motor cavity 2 may contain clean fluid, e.g., oil. A membrane 3 in the main housing 1 communicates with a port 4 in the motor cavity 2 wall so that the motor cavity 2 is pressure balanced with the annulus 20. In an alternative embodiment (not depicted), the membrane 3 can be replaced with a suitable bellows or a sliding piston. Motor control circuitry 300 (a part of which commutates the motor 5 by energizing and de-energizing stator windings of the motor 5) is contained in a pressure shielded compartment (not shown) and drives the BLDC motor 5 by commutating the motor windings A, B, and C as will be discussed with reference to FIG. 3. The BLDC motor 5 and associated pilot valve 8 may be driven to encode data for transmission to the surface via mud pulse telemetry.

Among the connections between the motor control circuitry 300 and the motor assembly 5, 5a are feed through wires 24 that electrically couple the BLDC motor 5 to the motor control circuitry 300. The feed through wires 24 pass through a pressure barrier 26 that delineates the pressure shielded compartment. Each of the feed through wires 24 are electrically coupled to one of the stator windings of the BLDC motor 5 to allow the motor control circuitry 300 to power the BLDC motor 5. As used herein, "commutation" refers to sending electrical signals to the BLDC motor 5 and in particular energizing and de-energizing in sequence motor stator windings A, B, and C such that the rotor of the BLDC motor 5 is torqued about its axis of rotation.

Advantageously, in one embodiment, the method that measures the overall voltage and the overall current supplied to the motor does not need any commutation information, which is the case for the traditional methods. As further explained below, the motor control 300 further provides a determination of the pilot valve 8 position (which varies in a known proportional relationship to the motor angular rotation), which is useful for effective mud-pulse modulation.

With continued reference to FIG. 1, compression spring 11 acting on the piston 13 biases the piston 13 to move in the downwards direction towards the orifice 28. The port 16 maintains the pressure in the lower chamber 15b at the same pressure as exists inside annulus 20, and this pressure exerts an upwards force on the lower face 34 of the piston 13 against the compression spring 11.

The pressure in the upper chamber 15a, providing the pilot valve 8 is closed, equalizes with the lower pressure below the orifice collar 18 via the control port 14 and hollow cylinder 30. The action of the spring 11 and the pressure in the upper chamber 15a are relatively weak and the piston 13 will rise due to the pressure in the lower chamber 15b. The restriction at the orifice collar 18 is thus exposed and the pressure at the orifice reduces until an equilibrium is reached.

When the pilot valve 8 is opened, however, mud flow enters the upper chamber 15a raising the pressure on the upper face 32 of the piston 13. The piston 13 moves downwards, moving the valve tip 22 towards the orifice collar 18 and, by restricting the flow of the drilling mud through the orifice 28, increases the pressure in the drill pipe 19 and annulus 20. The piston 13 continues to move downward until the pressure in the upper chamber 15a combined with the spring force is balanced by the pressure acting on piston 13 lower face 34, which is exposed to the fluid in the lower chamber 15b. This feature provides a negative feedback and results in stable, proportional control. This downwards balanced position of the piston 13 corresponds to the mud pulser 10's on-pulse state in a binary signaling system.

When the pilot valve 8 is closed, the flow of mud into the upper chamber 15a is stopped. The pressure in the upper chamber 15a then equalizes with that at the valve tip 22. The pressure at the valve tip 22 is lower than the pressure in the narrower annulus 20, so that the pressure in the lower chamber 15b once again becomes higher than the pressure in the upper chamber 15a. The piston 13 then gradually moves upwards against the action of the compression spring 11 until it adopts its initial or off-pulse position.

The position of the piston 13 when it has moved fully downwards to its on-pulse position will depend on the characteristics of the spring 11 and on the ratio of the hydraulic impedances of the control port 14, which allows mud flow between the upper chamber 15a and the hollow cylinder 30, and through the pilot valve 8, which allows mud flow between the pilot valve chamber 23 and the upper chamber 15a.

The amount of pressure modulation that can be achieved is dependent on the hydraulic impedances of the control port 14 and the pilot valve 8. If either of these becomes stepped, the piston 13 will not operate correctly and the telemetry provided by the device will fail.

Figure 2A:
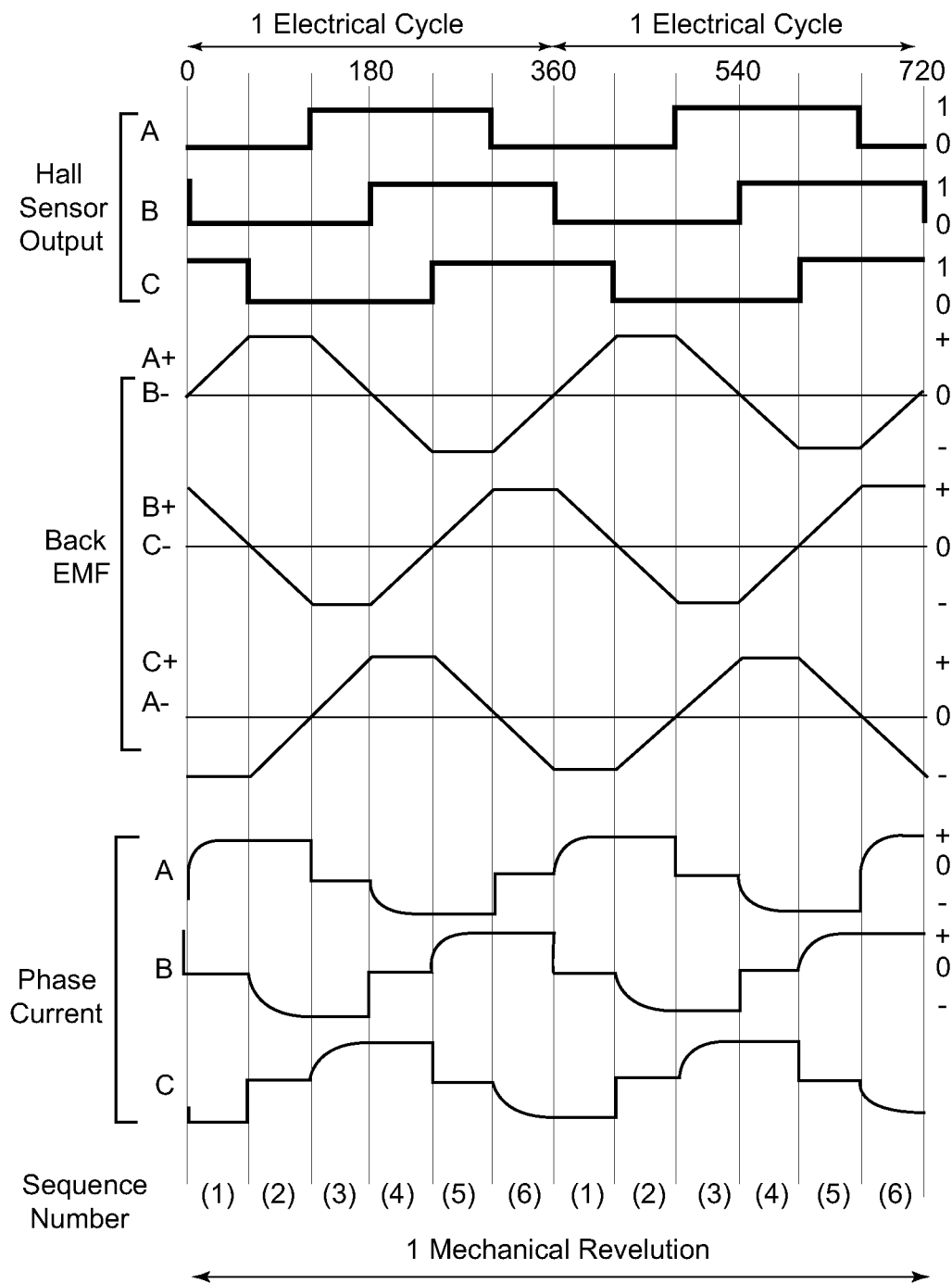
FIG. 2(a) shows graphs of Hall effect sensor output, back emf voltages, and phase current for a motor according to an exemplary embodiment.

Referring now to FIG. 2(a), FIG. 2(a) shows graphs of the various outputs of Hall effect sensors as measured over one full (360°) mechanical revolution of the rotor of multipole BLDC motor 5 installed in the mud pulser 10. FIG. 2(a) further shows the back emf signals generated during the BLDC motor 5's operation and the phase current supplied to the BLDC motor 5 from the motor control circuitry 300 during motor commutation. The BLDC motor 5 whose characteristics are depicted in FIG. 2(a) has two pairs of poles on its rotor and consequently, every 30° of mechanical rotation corresponds to 60° of an electrical cycle.

The BLDC motor 5 in the present exemplary embodiment has three stator windings: A, B, and C. As shown in FIG. 2(a), the three stator windings are electrically coupled such that the generated back emf signals are trapezoidal. In alternative embodiments (not depicted), the BLDC motor 5 may have more than three stator windings, and they may be electrically coupled to generate back emf signals of different waveforms (e.g., sinusoidal).

The upper part of FIG. 2(a) shows the output of three Hall effect sensors mounted in the BLDC motor 5. One sensor is mounted adjacent to each of the stator windings. Every 30° of mechanical rotation, which as mentioned above corresponds to 60° of an electrical cycle, the output of one of the Hall effect sensors Hall A, Hall B, and Hall C changes from high to low or vice-versa. Every 180° of a mechanical rotation, the outputs of the Hall effect sensors repeat. As the Hall effect sensor outputs change every 30° of mechanical rotation, the BLDC motor 5 can be commutated by recognizing six different electrical sequences that are used during commutation: 1 through 6, as noted in FIG. 2(a). The current that passes through the stator windings when the motor is commutated is depicted in the "Phase Current" graphs of FIG. 2(a).

When commutating the DC motor using readings from Hall effect sensors Hall A, Hall B, and Hall C as feedback, the motor control circuitry 300 detects the electrical sequence for the motor based on the readings of the Hall effect sensors, and governs (commutates) the motor by sequentially applying a battery voltage across the different stator windings A, B, or C of the motor, depending on whether clockwise or counter-clockwise rotation is desired.

In order to determine the angular rotation of the rotor for the purpose of driving the pilot valve 8, the motor control circuitry 300 is configured to not use rotor position indications from any of Hall effect sensors Hall A, Hall B, or Hall C to make such determination. Instead, according to an embodiment, the motor control circuitry 300 determines a current angular rotation θ of the rotor, using one of the methods schematically depicted in later figures.

As shown in FIG. 2(a), the back emf voltage on the graph labelled "A+/B−" can be determined by measuring it across winding A; the back emf voltage on the graph labelled "B+/C−" can be determined by measuring it across winding B; and the back emf voltage on the graph labelled "C+/A−" can be determined by measuring it across winding C.

Figure 6:
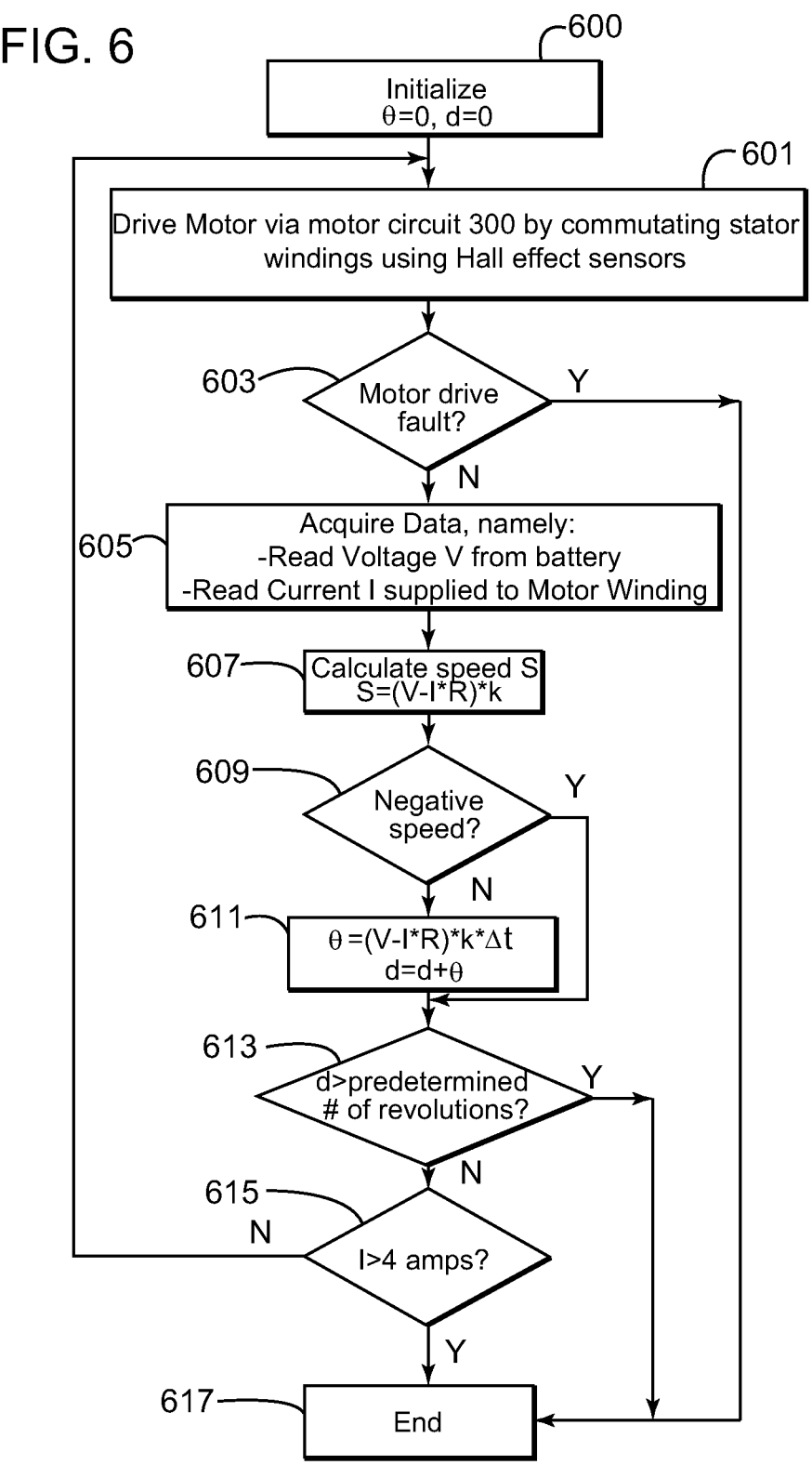
FIG. 6 is a flow chart illustrating a method for using back emf voltage to determine an angular position of a rotor according to an exemplary embodiment.

Alternatively, the back emf voltage may be calculated from current values for current supplied to individual stator windings A, B, and/or C, using, for example, the method shown in FIG. 6 herein, and as further described herein. However, the methods described in this paragraph and in the paragraph above require commutation information in order to make the measurements.

According to an exemplary embodiment, there is a method that does not require the commutation information and in this method the overall current (I) supplied to the motor is measured and then multiplied with an average resistance (R) of the windings. This product is subtracted from an overall measured voltage supplied to the motor. The result is then multiplied by a constant k and the rotor angular rotation may be determined by time integrating this result.

As shown in the graph of "back EMF" signals within FIG. 2(a), each of the Hall effect sensor output transitions corresponds to a phase transition in one of the back emf signals.

Figure 10:
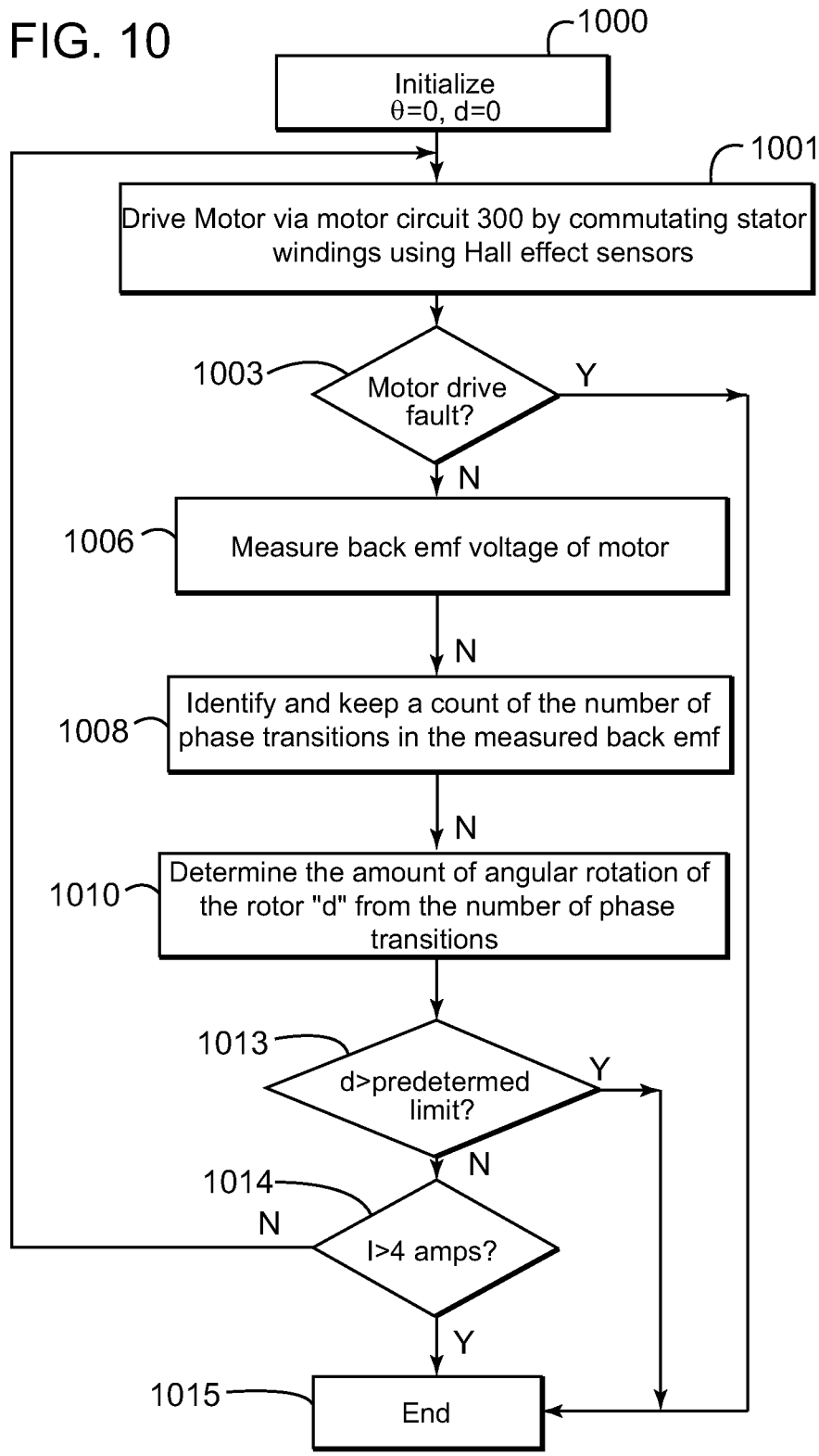
FIG. 10 is a flow chart illustrating a method for determining a total angular rotation of a rotor according to an exemplary embodiment.

This phase transition is also known as a "zero crossing". In an embodiment as discussed below, and as depicted in FIG. 10, by determining and counting these back emf voltage phase transitions, the motor control circuitry 300 is able to determine the number of rotations (or more specifically fractions of rotations) of motor 5 without relying on readings from the Hall Effect sensors.

Figure 2B:
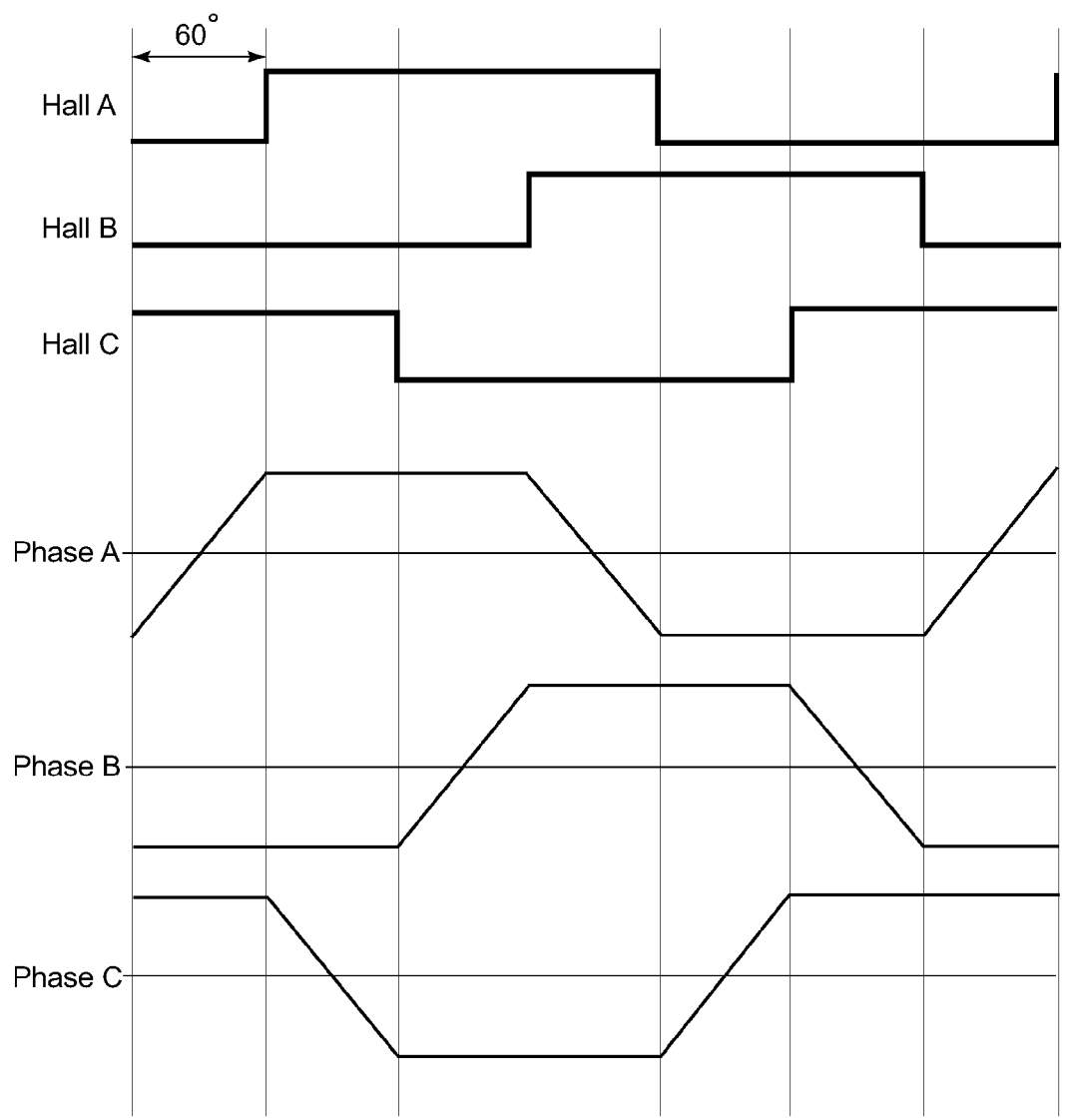
FIG. 2(b) shows enlarged graphs of Hall effect sensor output and phase current for another electric motor according to an exemplary embodiment.

As mentioned above, the exemplary BLDC motor 5 whose characteristics are depicted in FIG. 2(a) has two pairs of poles on its rotor. In alternative embodiments, BLDC motors having more or fewer pairs of poles on its rotor can be used and the graphs shown in FIG. 2(a) will accordingly change. For example, the graphs of FIG. 2(b) depict characteristics of an exemplary BLDC motor that has a single pair of poles on its rotor. As in FIG. 2(a), the output of Hall effect sensors are contrasted with the back emf signals measured across stator windings A, B and C. In contrast to the motor of FIG. 2(a), 60° of mechanical rotation corresponds to 60° of an electrical cycle. Additionally, in the motor of FIG. 2(b) the phase transitions/zero crossings in the back emf signals are offset 30° from the corresponding edges in the signals from the Hall effect sensors. The motor control circuitry 300 can be configured to compensate for this 30° offset, and for any similar offset that may exist in BLDC motors of alternative embodiments, such that the back emf signals can still be used to efficiently and properly determine rotor angular rotation. In further alternative embodiments (not depicted), BLDC motors having any suitable number of stator or rotor poles can be used.

Figure 3:
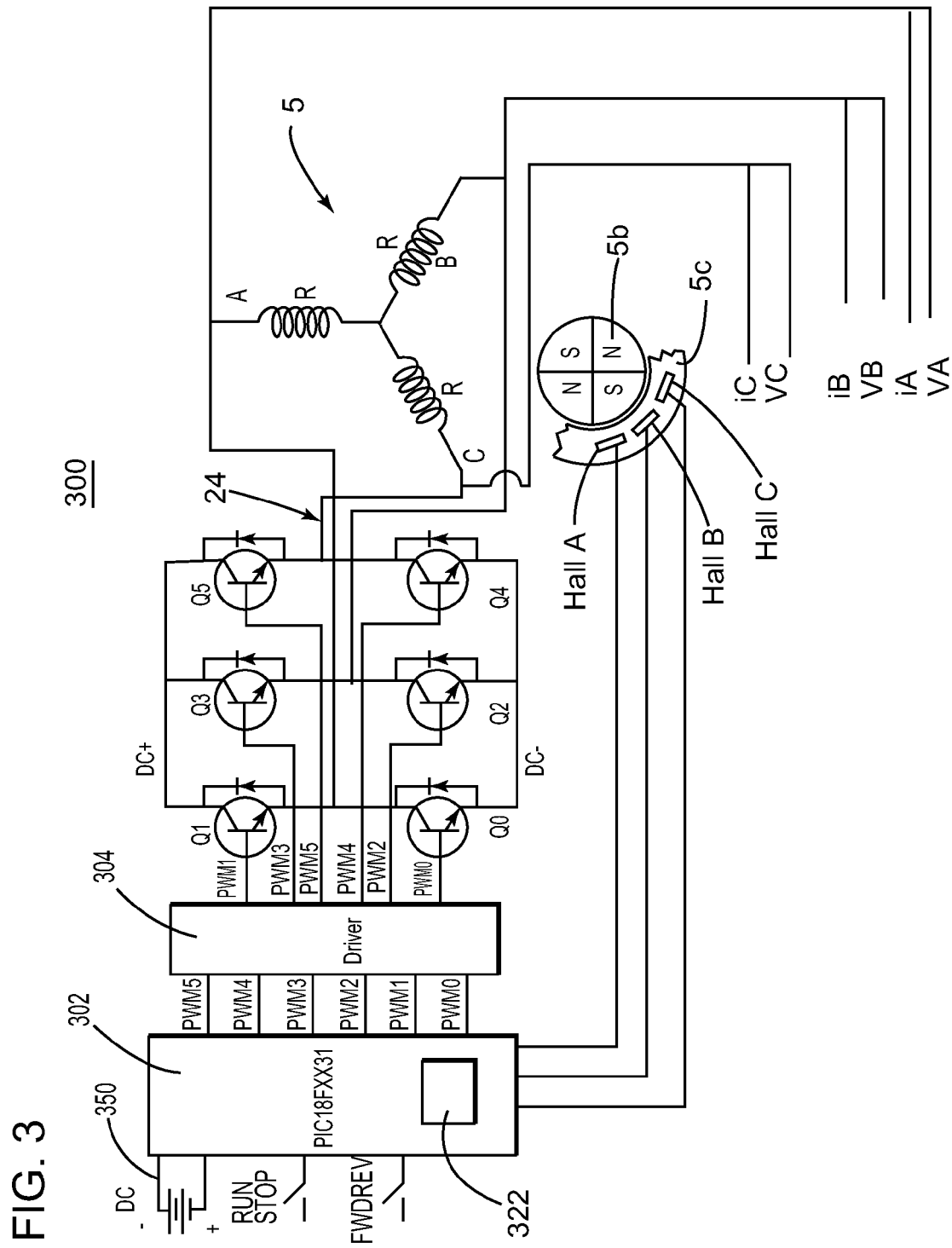
FIG. 3 is a schematic diagram showing a motor control circuitry using Hall effect sensors for commutation and back emf voltage for angular position according to an exemplary embodiment.

Referring now to FIG. 3, there is shown a diagram of the motor control circuitry 300 used to commutate the motor 5, having Hall effect sensors Hall A, Hall B, and Hall C, positioned about the periphery of a rotor 5b of the motor 5. The Hall effect sensors may be placed on a stator 5c that is located around the rotor 5b. The motor control circuitry 300 includes a microcontroller 302 which, in the depicted embodiment, is a Microchip™ PIC18F2431 microcontroller manufactured by Microchip Technology Inc. of Chandler, Ariz., USA. In alternative embodiments (not depicted), any suitable controller, such as a processor, microcontroller, programmable logic controller, field programmable gate array, can be used, or the functionality of the microcontroller 302 may be implemented using, for example, an application-specific integrated circuit. The microcontroller 302 includes a computer readable medium 322, such as flash memory, that stores instructions regarding how to commutate the motor. The microcontroller 302 controls commutation of the BLDC motor 5 by using, for example, pulse width modulation on outputs PWM[0 . . . 5], which are amplified using, for example, a field effect transistor (FET) driver 304. The active PWM[0 . . . 5] outputs for clockwise motor rotation are different from counter-clockwise motor rotation as would be recognized by those skilled in the art.

The IGBT driver 304 outputs the amplified PWM[0 . . . 5] outputs to a series of switched gates Q0 . . . Q5, which when actuated by IGBT driver 304 via the feed through wires 24 in the sequence shown in FIG. 4, allow one of the windings A, B, or C, as the case may be, to be energized, and another to be de-energized. As seen from FIG. 3, battery 350 supplies, for example, 24V DC power for use in operating the microprocessor 302 and IGBT driver 304, and commutating the motor 5. Other configurations for the motor control circuitry 300 may be implemented.

Figure 4:
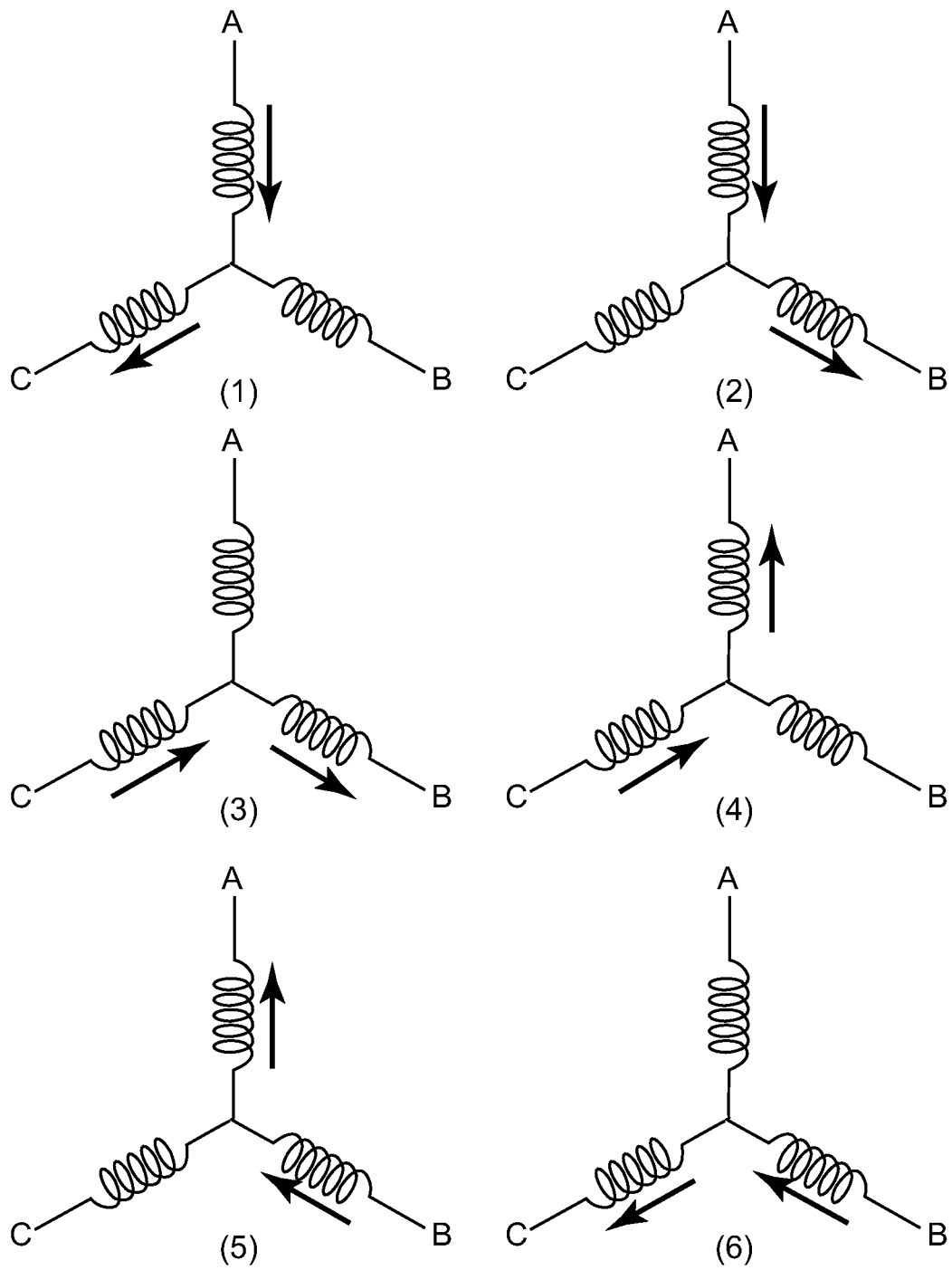
FIG. 4 is a schematic diagram showing a winding energization sequence of an electric motor.
Figure 5:
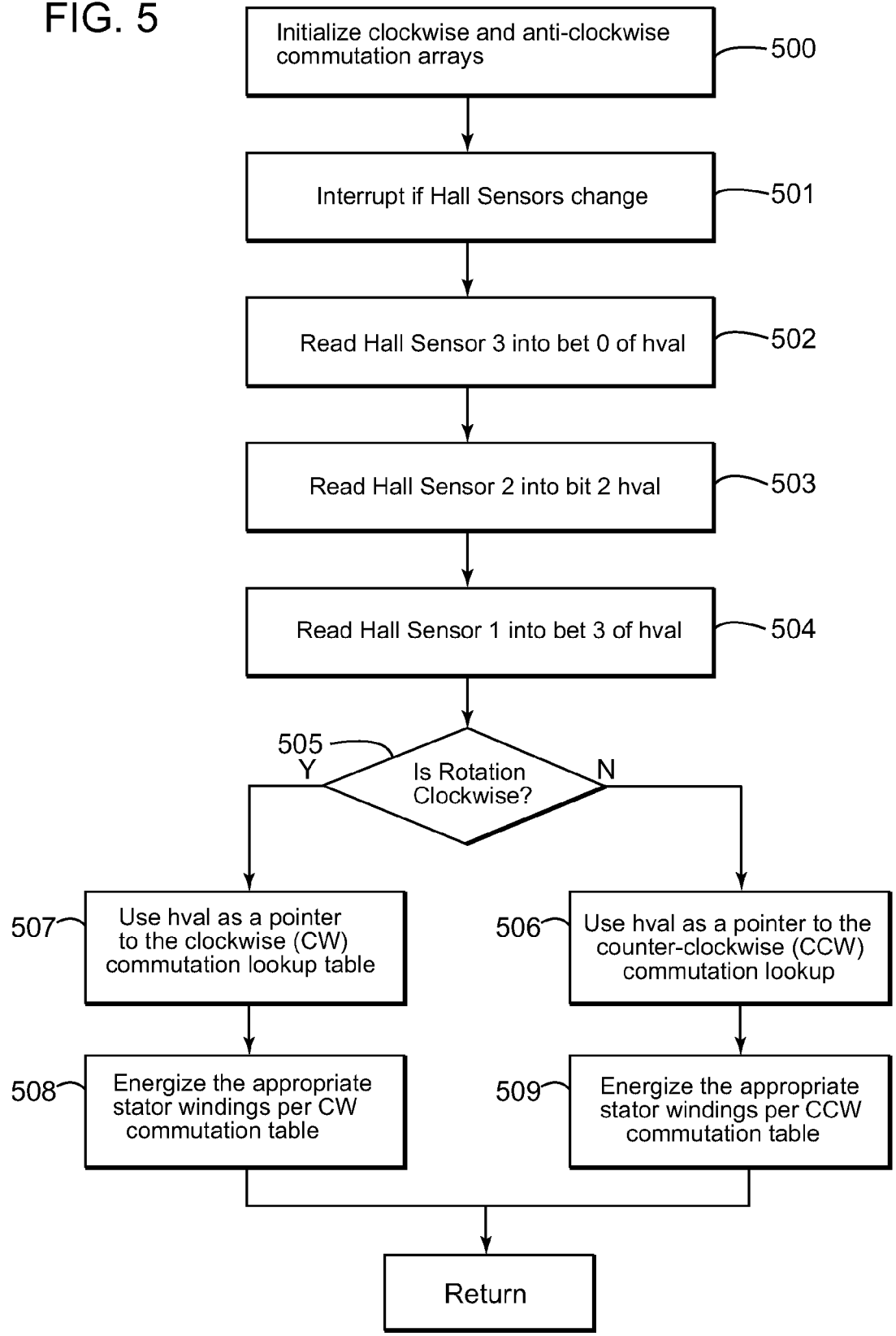
FIG. 5 is a flow chart illustrating the manner of using Hall effect sensors to commutate motor windings according to an exemplary embodiment.

Next, a method for commutating the BLDC motor 5, using Hall sensors Hall A, Hall B, and Hall C, in either a counter-clockwise or a clockwise rotation is discussed with reference to FIG. 5. Commencing at step 500, clockwise and counter-clockwise commutation arrays are initialized. In step 501, a check is performed prior to commutating the motor. In steps 502, 503, and 504 respective sensed values from each of Hall sensors are read into a variable "hval", which allows a determination to be made as to where the rotor position is in the sequence 1-6. If motor commutation is desired to be clockwise (step 505—determined by microprocessor 302), the values read into "hval" are used as a pointer (step 507) to determine where in the clockwise sequence of energization positions 1-6 the rotor is located, so that the clockwise commutation sequence may start (step 508) at the desired energization sequence 1-6 (ref. FIG. 4). Alternatively, if motor commutation is desired to be counter-clockwise, the values read into "hval" are used as a pointer (step 506) to determine where in the counter-clockwise sequence of energization positions 1-6 the rotor is located, so that the counter-clockwise commutation sequence may start (step 509) at the desired energization sequence 1-6 (ref. FIG. 4).

Turning now to methods for determining an angular position of the rotor of the motor, and a corresponding linear position of a valve, a variety of approaches may be used to determine back emf signals of the stator windings A, B, and C, and count the number of phase transitions which occur over a period of motor rotation. These approaches include but are not limited to (i) comparing the voltage of each of the feed through wires 24 to half the DC voltage (12.5V in the depicted embodiment) used to drive the BLDC motor 5; (ii) comparing the voltage of each of the feed through wires 24 to a virtual ground signal; or (iii) simply sampling the voltage of each of the feed through wires 24 and inputting that value directly into the microcontroller 302 for digitization and use. In the first two approaches, the result of the comparison is a square wave in which the wave is high when the back emf voltage is greater than zero and low when the back emf voltage is less than zero. Consequently, the microcontroller 302 can rely on edge detection to determine where the phase transitions of the back emf signals occur. In the third approach, a digitized version of the entire trapezoidal back emf signal may be input to the microcontroller 302. To determine when the phase transitions occur, the microcontroller 302 compares the digitized back emf signal to a reference zero point. As mentioned above, in alternative embodiments (not depicted) the microcontroller 302 may consider more or different information than zero crossings. For example, the microcontroller 302 may additionally or alternatively utilize the entire waveform of the back emf signals to determine any one or more of their rate of change; maximum and minimum values; and overall shape in order to determine the number and when such phase transitions occur.

Another manner of determining back emf voltages for use not in commutating the motor 5 but for determining the current angular rotation θ of the motor 5, may be accomplished by calculating such values from sensed current values, and knowing the resistance of each of the stator windings. Such method, as discussed further herein, involves sensing one of the current values IA, IB, and IC supplied to the stator windings A, B, and C, respectively, and then calculating, in the microprocessor 302 (or another microprocessor, not shown), the back emf by applying Ohm's law:

$$\text{back emf} = V_{across\ battery} - (I_{winding\ a,\ b,\ or\ c} \cdot R_{winding\ a,\ b,\ or\ c}) \cdot k,$$

where:
  V is the voltage across the battery supplied to the motor;
  I is the current supplied to the stator windings A, B, or C;
  R is the electrical resistance of the stator windings A, B, or C; and k is a proportionality constant which when multiplied by the product of (V−I·R) produces back emf voltage of the motor.

The above formula is based on the principle that for a DC motor, the back emf is proportional to the rotor speed, related by some known constant k. Such a constant may be determined by measuring the rotor speed when the motor runs unloaded on a known supply voltage. The winding resistance may be measured with the motor stalled. The back emf is measurable by measuring the supply voltage and subtracting the current times the winding resistance. The rotation of the rotor is then equal to the time-integral of the speed. The current term ensures that a heavily loaded motor, which would turn more slowly, is correctly monitored. An enhancement to the algorithm is to correct the known resistance for the effect of temperature, which rises linearly with the temperature.

According to an embodiment illustrated in FIG. 6, a method for determining the angular rotation "d" of the motor 5 is now discussed. The motor circuitry 300 controls the motor 5, and in particular how to avoid overdriving the pilot valve 8 of the mud pulser 10 past the fully open or fully closed position and thereby wasting limited power of the battery 350.

Commencing at step 600, values of a current motor rotation θ for an incremental time period Δt, and a total value "d" of the motor rotation over a given time period when the pilot valve 8 is in the fully open or fully closed position, are initially set to zero. Thereafter, at step 601, the motor drive circuitry 300 is used to commutate the motor 5 in a clockwise manner if the pilot valve 8 is being closed, or in a counter-clockwise manner if the pilot valve 8 is being moved from the open to the closed position. Thereafter, at step 603, a determination is made if there is any motor drive fault, by determining if there is any change in the values sensed by the Hall effect sensors. If no change (the motor is unable to move) is present, a motor fault is indicated, and the sequence stops (step 617). Otherwise, at step 605, the microprocessor acquires (reads) voltage V from battery 350, and reads current IA, IB, or IC as applicable of the stator windings.

Thereafter, at step 607, using the relationship that the motor speed is related to back emf by a predetermined proportionality constant "k", a speed "S" of the rotor of the motor 5 is determined by the microprocessor by applying the formula:

$$speed = (V - I \cdot R) \cdot k.$$

Step 609 determines if the speed is negative (if so, it goes directly to step 613). If not, the current angular rotation θ is determined in step 611 by a numerical integration approximation method, namely multiplying the calculated speed by a value of an incremental small time period Δt, and adding the obtained value θ to total angular rotation "d". Thereafter, at step 613, a determination is made if the total angular motor rotation "d" exceeds a predefined limit, namely the number of motor rotations required to drive the valve pilot 8 from a fully open to a fully closed position, or vice versa, and if so further rotation is ceased (step 617).

In another embodiment, before returning to step 601 and commencing further motor rotation if the predetermined limit is not reached, at step 615 a first check is made to determine if the motor is drawing current in excess of a predetermined amount. If so, further motor rotation in that direction ceases. FIG. 6 shows an exemplary value of 4 A for the current limit. However, other values may be used depending on the motor and other conditions.

Figure 7:
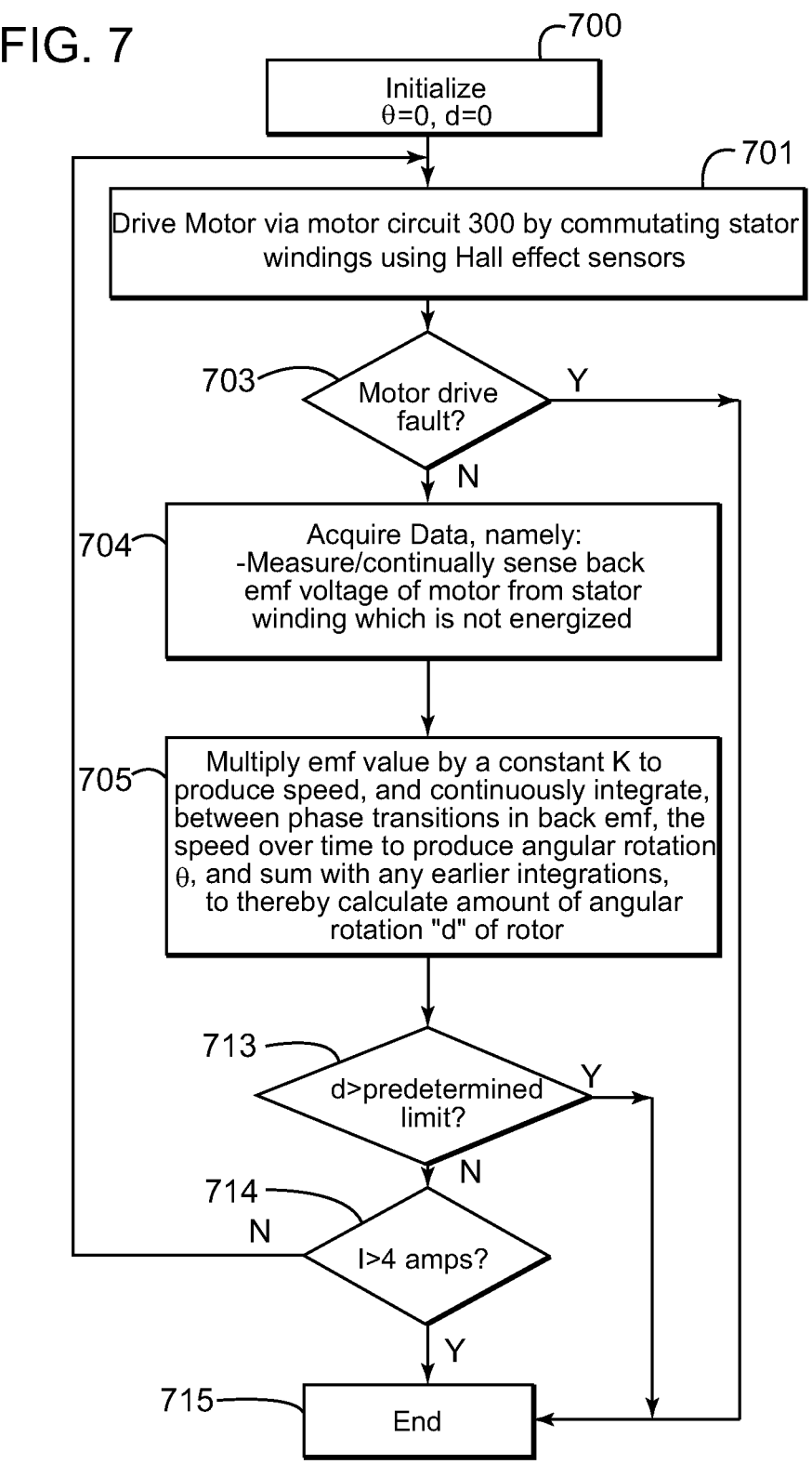
FIG. 7 is a flow chart illustrating another method for using back emf voltage to determine an angular position of a rotor according to an exemplary embodiment.

FIG. 7 shows an alternative method of determining the total angular rotation "d" of motor 5 of a mud pulser 10, and using such determined value to control the mud pulser's operation and in particular the extent of travel of the pilot valve 8.

In the method illustrated in FIG. 7, initial consecutive steps 700, 701, and 703 correspond to initial steps 600, 601, and 603 of FIG. 6, and thus, they will not be again repeated.

As shown in step 704 of FIG. 7, the motor control circuitry 300 may continually sense (instead of calculating), in any of the manners indicated above, the back emf of the motor. In one embodiment, the motor control circuitry 300 senses the back emf voltage from one of the three stator windings which is not energized at the given sampling time. Thereafter, as shown in step 705, the motor control circuitry 300 is configured to multiply the measured emf values by a constant k to produce the speed of the rotor, and to thereafter continuously integrate, between phase transitions in the sensed back emf, the speed over time to produce the current angular rotation θ. Such determined amount θ is summed with any earlier integration, to thereby calculate the total amount of angular rotation "d" of the rotor. Thereafter, the steps 713, 714, and 715 of FIG. 7, are identical to steps 613, 615, and 617 of FIG. 6.

Figure 8:
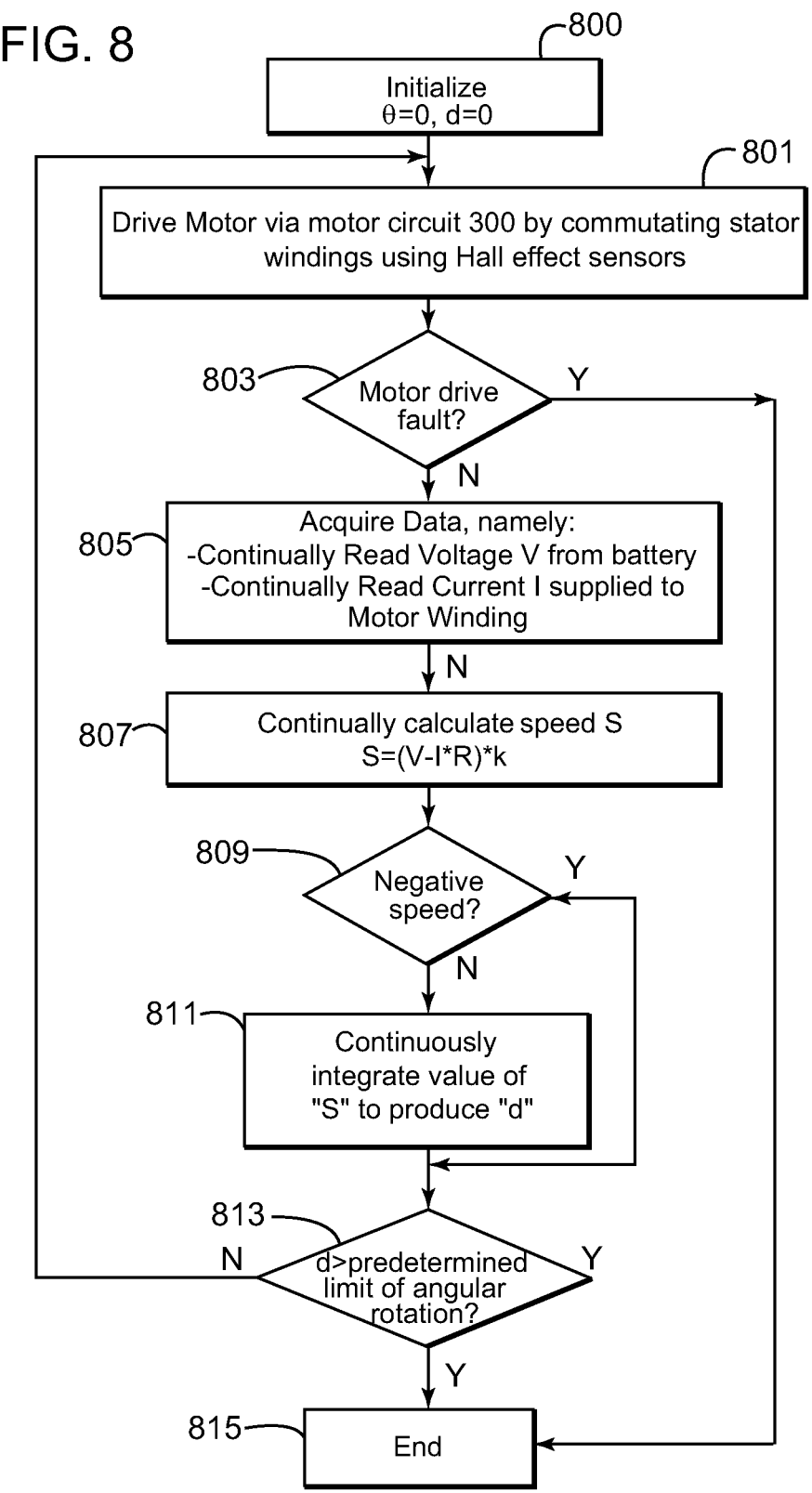
FIG. 8 is a flow chart illustrating still another method for using back emf voltage to determine an angular position of a rotor according to an exemplary embodiment.

FIG. 8 shows yet a further alternative method of determining the total angular rotation "d" of a motor 5 of a mud pulser 10, and using such determined value to control the mud pulser's operation and in particular the extent of travel of a pilot valve 8.

Again, in the method of FIG. 8, initial consecutive steps 800, 801, and 803 correspond to initial steps 600, 601, and 603 of FIG. 6, and will not be again repeated.

At step 805, an overall voltage V supplied to the motor 5 is monitored, as is the overall current I supplied to motor. At step 807, using such values, the motor control circuitry 300, via microprocessor means 302 or other microprocessor, calculates (e.g., continuously) the speed by applying the formula $$Speed = (V - I \cdot R) \cdot k$$

to the monitored values of V, I, and using the known average stator winding resistance R, and a known proportionality constant k. In an alternative embodiment, a step 809 may be inserted to check that the resultant speed is not a negative value. If the speed is negative, the process advances to step 813.

Thereafter, at step 811, assuming no negative speed value obtained, the resultant value of speed may be integrated over time to produce a value for the total angular rotation "d" of the rotor over such time interval. Remaining steps 813 and 815 are similar to steps 713 and 715 of FIG. 7 and thus, not described herein.

Microprocessors which continually or not integrate values are well known to those skilled in the art. For example, one manner of continually integrating an obtained value of speed, as calculated in step 705 of FIG. 7, and in step 811 of FIG. 8, at least in an analog circuit, is to employ an operational amplifier.

Figure 9:
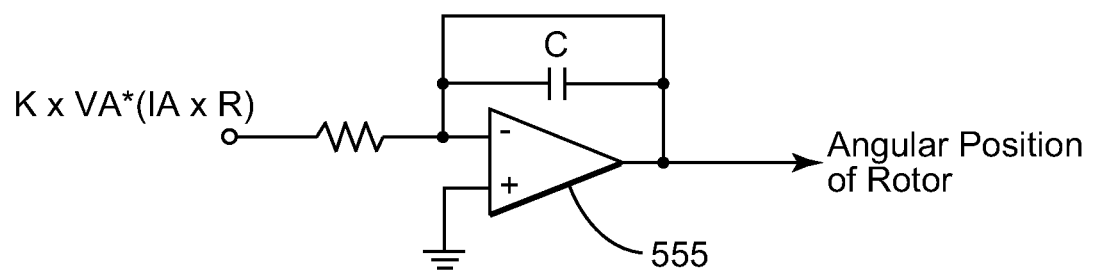
FIG. 9 is a schematic depiction of an operational amplifier to determine back emf voltage according to an exemplary embodiment.

FIG. 9 shows an operational amplifier 555 which may be used in an analog method for integrating the numerical product of k·[V−(I·R)], as in the method depicted in FIG. 7, step 705, and in the method depicted in FIG. 8, step 811.

Other means and methods of continually integrating, through digital means or other numerical integration means, a sensed/calculated value (in this case, the value of the speed over a given time period), is now apparent to those skilled in the art.

Referring now to FIG. 10, there is shown another method for operating a mud pulser 10. This method may be stored in the computer readable medium 322 of the microcontroller 302 or other microprocessor (not shown), or on any other suitable computer readable medium, including disc-based media such as CD-ROMs and DVDs, magnetic media such as hard drives and other forms of magnetic disk storage, semiconductor based media such as flash media, random access memory, and read only memory.

Pursuant to the method shown in FIG. 10, the microcontroller begins at step 1000 and proceeds to step 1001 to commutate the BLDC motor 5 by energizing and de-energizing stator windings A, B, and C in the manner described above. The commutation causes the rotor of the motor to rotate in a clockwise or counter-clockwise direction, typically (but not necessarily) from a position where the pilot valve 8 is in a fully open position, in which case the motor rotation is clockwise to cause the pilot valve 8 to move toward the closed position, or if in the fully closed position, the rotor rotates counter-clockwise to move the pilot valve 8 toward the fully open position. Steps 1001 and 1003 are similar to steps 701 and 703 of the method illustrated in FIG. 7, and thus, these steps are not discussed herein.

Once the BLDC motor 5 is operating and is generating the back emf signals, the motor control circuitry 300 is able to measure the back emf signals at step 1006 and identify and keep a count of the phase transitions that occur in the back emf signals at step 1008. Once the phase transitions are counted over a given period of time during which the motor has rotated, the total angular rotation "d" of the motor 5 can then be determined in step 1010. Due to the relationship between the angular rotation of the motor shaft and the linear movement of the pilot valve 8 (created by the rotary-to-linear converter 5a), the extent of movement of the pilot valve 8 for a given angular rotation of the motor can be determined, and a limit in the angular rotation of the motor thereby can be determined to avoid unnecessary overdriving of the pilot valve 8 in the fully open or fully closed position.

Decision step 1013 in FIG. 10 thus causes the motor control circuitry 300, after driving the motor 5, to determine whether the limit in the angular rotation of the motor has reached a pre-defined limit. If yes, the motor is ceased to be driven in step 1015. If no, in an optional embodiment, a further query (step 1014) is made as to whether the motor current is greater than a predefined limit (to prevent overdriving the motor). If yes, the driving of the motor then ceases (step 1015). If no, driving of the motor continues with a return to step 1001.

As discussed above, the microcontroller contained in motor control circuitry 300 is able to cause the BLDC motor 5 to rotate in clockwise or counter-clockwise directions. In the present embodiment, this motion of the motor 5 may be used to transmit "0" and "1" signals as discussed next. In this binary signaling scheme, a high pressure or "1" signal can be sent by completely opening the pilot valve 8, e.g., by rotating the BLDC motor 5 counter-clockwise to cause the pilot valve 8 to retract from the valve seat/orifice 9 such that the pilot valve 8 does not impede mud flow through the valve orifice 9. Similarly, a low pressure or "0" signal can be sent by closing the pilot valve 8, e.g., by rotating the BLDC motor 5 clockwise to cause the tip of the pilot valve 8 to step the valve seat/orifice 9, which prevents mud from flowing through the valve orifice 9.

Through calibration prior to downhole deployment, the microcontroller 302 can be programmed with the total number of motor rotations (including fractional portions or increments thereof) used to transition the pilot valve 8 from the completely closed position (i.e., when the pilot valve 8 is inserted as far as possible into the valve seat 9) to the completely opened position (i.e., when the pilot valve 8 is retracted as far as possible from the valve seat 9). By determining the number of phase transitions and thus the current angular rotation θ the BLDC motor 5 has undergone relative to either the completely opened or the completely closed positions, the microcontroller 302 is able to determine where the tip of the pilot valve 8 is between the completely opened and completely closed positions. Consequently, the microcontroller 302 is able to vary the flow rate of the mud through the pilot valve 8. In this way, the microcontroller 302 can control the height of the pressure pulses that the mud pulser 10 transmits, and send messages encoded using non-binary modulation schemes, such as quadrature amplitude modulation.

Figure 11:
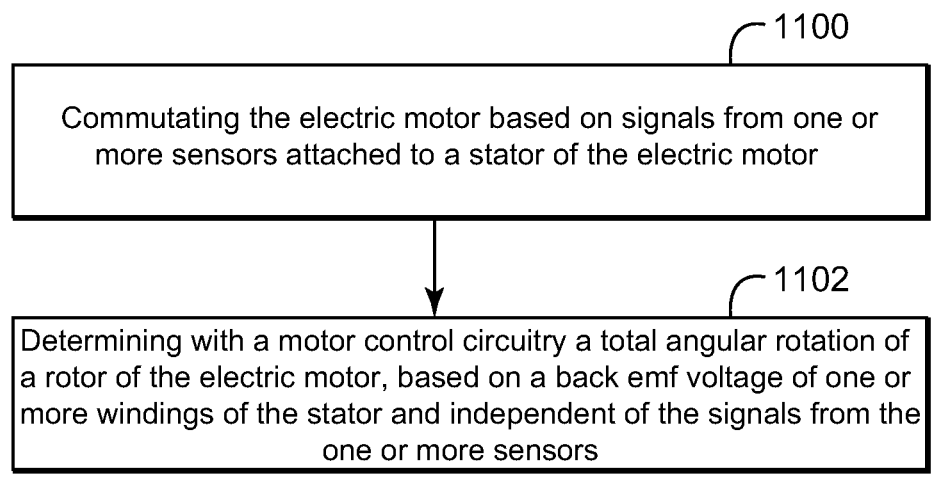
FIG. 11 is a flow chart of a method of operating an electric motor according to an exemplary embodiment.

A method for controlling an electric motor is now discussed with reference to FIG. 11. The method includes a step 1100 of commutating the electric motor based on signals from one or more sensors attached to a stator of the electric motor; and a step 1102 of determining with a motor control circuitry, electrically connected to the electric motor, a total angular rotation of a rotor of the electric motor, based on a back emf voltage of one or more windings of the stator and independent of the signals from the one or more sensors.

One or more of the exemplary embodiments discussed above provide an electric motor and a corresponding controller for commutating the motor based on sensor measurements and for determining a rotational position based on a sensorless approach. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. An electric motor assembly that uses sensors for commutation and back electro-magnetic force (emf) voltage to determine an angular position, the electric motor assembly comprising:
   an electric motor having a rotor and a stator that includes one or more windings;
   one or more sensors on the stator and configured to determine an angular position of the rotor; and
   a motor control circuitry electrically connected to the electric motor and to the one or more sensors and configured to control a commutation of the electric motor based on signals received from the one or more sensors,
   a valve member attached to the rotor of the electric motor;
   wherein the motor control circuitry is configured to calculate the back emf voltage from values of an overall current supplied to the electric motor, an overall voltage supplied to the electric motor and an average resistance of the one or more windings;

wherein the motor control circuitry is further configured to calculate a total angular rotation of the rotor using the back emf voltage by integrating over a period of time a product of the back emf voltage and a proportionality constant k, to produce a value of the total angular rotation of the rotor over the period of time of the one or more windings;

wherein the motor control circuitry is further configured to control the electric motor based on the back emf voltage and not based on the signals from the one or more sensors; and wherein the motor control circuitry is further configured to track a position of a pilot valve by counting a number of phase transitions relative to the completely closed position or the completely opened position of the pilot valve, and to convert the number of phase transitions to the total angular rotation of the rotor of the electric motor; and wherein the motor control circuitry is configured to store a pre-defined angular rotation limit corresponding to an amount of the angular rotation of the rotor of the electric motor that cause the valve member to move from a first fully open position to a second fully closed position, or vice versa.

2. The electric motor assembly of claim 1, wherein the one or more sensors is a sensor.

3. The electric motor assembly of claim 1, wherein the motor control circuitry is further configured to stop the electric motor from further rotating the rotor upon the total angular rotation of the rotor reaching the pre-defined angular rotation limit.

4. The electric motor assembly of claim 1, wherein the back emf voltage is a calculated value, determined based on a formula back emf=(V−I·R)·k, where V is the overall voltage supplied to the electric motor, I is the overall current supplied to the electric motor, R is the average resistance of the one or more windings, and k is the proportionality constant.

5. The electric motor assembly of claim 1, wherein the electric motor is a brushless direct current motor.

6. A mud pulser configured to transmit data from inside of a well to a surface of the well through pressure waves generated in a fluid column that flows inside the well, the mud pulser comprising:

a housing configured to be supported by a wall of the well;
an electric motor located in a motor cavity of the housing and having a rotor and a stator that includes one or more windings;
one or more sensors on the stator and configured to determine an angular position of the rotor;
a pilot valve connected to the electric motor and configured to move in a pilot valve chamber for closing and opening a valve orifice for generating pressure signals that propagate through the fluid column to the surface; and
a motor control circuitry electrically connected to the electric motor and the one or more sensors, and configured to control a commutation of the electric motor based on signals received from the one or more sensors;

wherein the motor control circuitry is configured to calculate a back electro-magnetic force (emf) voltage from values of an overall current supplied to the electric motor, an overall voltage supplied to the electric motor and an average resistance of the one or more windings;

wherein the motor control circuitry is further configured to calculate a total angular rotation of the rotor using the back emf voltage by integrating over a period of time a product of the back emf voltage and a proportionality constant k, to produce a value of the total angular rotation of the rotor over the period of time of the one or more windings;

wherein the motor control circuitry is further configured to control the electric motor based on the back emf voltage and not based on the signals from the one or more sensors; and wherein the motor control circuitry is further configured to track a position of the pilot valve by counting a number of phase transitions relative to the completely closed position or the completely opened position of the pilot valve, and to convert the number of phase transitions to the total angular rotation of the rotor of the electric motor;

wherein the motor control circuitry is configured to store a pre-defined angular rotation limit corresponding to an amount of angular rotation of the rotor of the electric motor that cause the pilot valve to move from a first fully open position to a second fully closed position, or vice versa.

7. The mud pulser of claim 6, further comprising:
a rotary-to-linear converter mechanically coupled between the electric motor and the pilot valve to enable linear reciprocation of the pilot valve when the rotor rotates, wherein the one or more sensors is a Halt sensor.

8. The mud pulser of claim 6, wherein the motor control circuitry is further configured to stop the electric motor from further rotating the rotor upon the total angular rotation of the rotor reaching the pre-defined angular rotation limit.

9. The mud pulser of claim 6, wherein the back emf voltage is a calculated value, determined based on a formula back emf=(V−I·R)·k, where V is the overall voltage supplied to the electric motor, I is the overall current supplied to the electric motor, R is the average resistance of the one or more windings, and k is the proportionality constant.

10. The mud pulser of claim 6, wherein the electric motor is a brushless direct current motor.

* * * * *